No. 883,596. PATENTED MAR. 31, 1908.
O. J. WAHLER.
MACHINE FOR TREATING BROOM CORN.
APPLICATION FILED DEC. 12, 1906. RENEWED SEPT. 4, 1907.
2 SHEETS—SHEET 1.
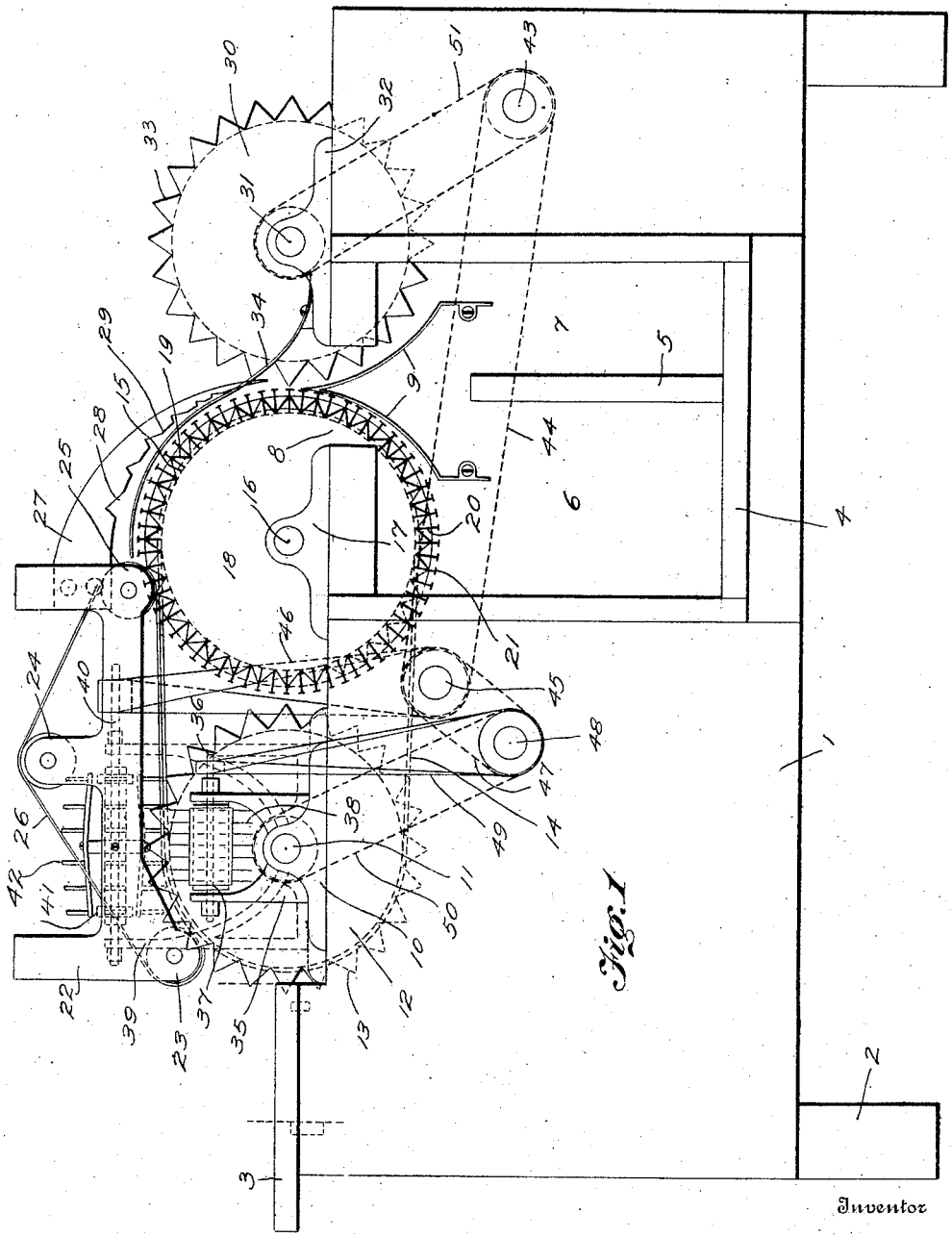
Witnesses
R. C. Claflin
G. S. Elmore
Inventor
Otto J. Wahler
By Victor J. Evans
Attorney No. 883,596. PATENTED MAR. 31, 1908.
O. J. WAHLER.
MACHINE FOR TREATING BROOM CORN.
APPLICATION FILED DEC. 12, 1906. RENEWED SEPT. 4, 1907.
2 SHEETS—SHEET 2.
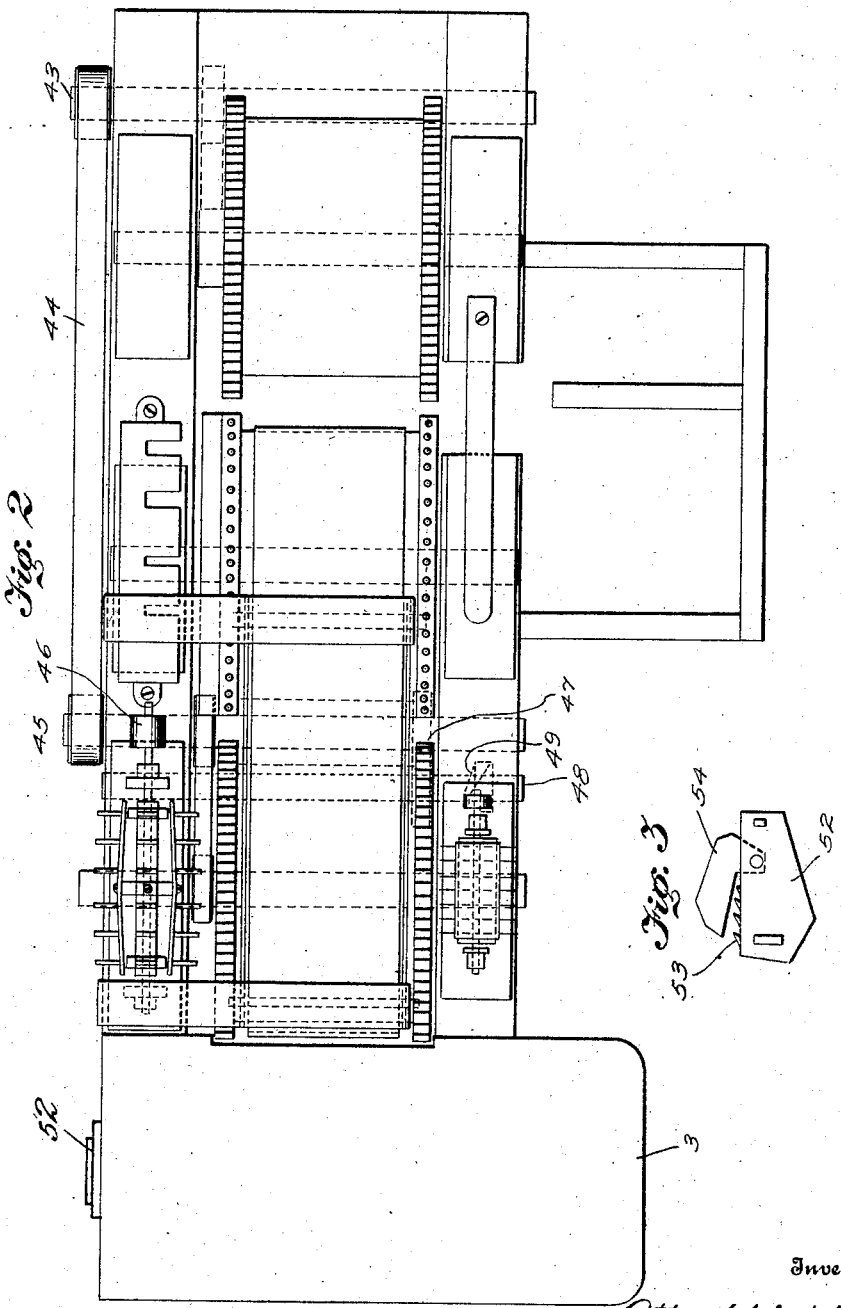
Witnesses
Inventor
Otto J. Wahler
By Victor J. Evans
Attorney

UNITED STATES PATENT OFFICE.

OTTO J. WAHLER, OF LEAVENWORTH, KANSAS.

MACHINE FOR TREATING BROOM-CORN.

No. 883,596.  Specification of Letters Patent.  Patented March 31, 1908.

Application filed December 12, 1906, Serial No. 347,539. Renewed September 4, 1907. Serial No. 391,325.

*To all whom it may concern:*

Be it known that I, OTTO J. WAHLER, a citizen of the United States, residing at Leavenworth, in the county of Leavenworth and State of Kansas, have invented new and useful Improvements in Machines for Treating Broom-Corn, of which the following is a specification.

This invention relates to machines for preparing broom corn for use in the manufacture of brooms or brushes and embodies in its organization a cutting knife for removing the stalk from the hurl, a scraping device for removing the seed from the hurl, a cutting device for severing the individual straws composing the hurl from the central spear or heart, and finally separating the finer from the coarser straws and depositing the separated material in appropriate receptacles or compartments provided for their reception.

The invention has for its objects to provide a comparatively simple, inexpensive machine of this character which will effectually separate the hurl to remove the central heart or spear therefrom, one wherein the hurl will be thoroughly cleaned and scraped in removing the seed therefrom, one wherein the material will be securely held during the scraping operation, and one wherein the straws will be accurately separated and graded and deposited to lie smoothly and evenly in the compartments of the receptacle.

With these and other objects in view, the invention comprises the novel features of construction and combination of parts more fully hereinafter described.

In the accompanying drawings: Figure 1 is a side elevation of a machine embodying the invention. Fig. 2 is a top plan view of the machine. Fig. 3 is a detail view of the cutting knife.

Referring to the drawings, 1 designates a box or casing mounted upon supporting legs 2 and having at its rear end a table 3, there being formed in the casing a box or receptacle 4 subdivided by a partition 5 into a pair of compartments 6 and 7, while mounted in the receptacle, which is provided with an inlet opening or mouth 8, over the partition 5 is a deflecting member or plate 9 of substantially inverted V-shape and having its upper edge projected slightly above the mouth of the receptacle.

Journaled in bearings 10 mounted on the casing is a main drum shaft 11 carrying a rotary drum 12, the heads of which are provided with radially projecting teeth 13, there being connected with said drum by means of a feed belt 14 a supporter drum 15 in turn carried by a shaft 16 journaled in bearings 17 fixed on the casing. The drum 15 has end heads 18 each provided with radiating teeth or serrations 19, while fixed in each of said heads is a peripheral series of relatively spaced radiating, separating teeth or fingers 20 provided at their outer ends with heads 21, for a purpose which will hereinafter appear.

Sustained above the drums 10 and 15 and terminating in rear of the vertical center of the latter is a belt frame 22 containing a plurality of guide rollers 23, 24, and 25 arranged as shown and on which there is mounted for travel an endless feed belt 26 adapted to contact at its lower face with the belt 14 and coöperate with the latter for feeding the material through the machine, while attached to one of the side plates of the frame 22 is a forwardly and downwardly curved retaining member or arm 27 having its lower edge which overlies and follows the curvature of the drum 15 provided with a plurality of spaced notches 28 forming individual portions or teeth 29 which in practice serve to spread the material from the separator drum and direct the finer straws between the teeth 20.

Situated at a point in advance of the drum 15 is a feed drum 30 carried by a shaft 31 journaled in bearings 32 on the casing and having its heads provided with radially projecting teeth or serrations 33 adapted to catch the coarser straws which pass over the drum 15, there being attached to the bearing 32 at the right hand side of the machine a rearwardly projecting guard member or strip 34 which extends over and is curved to conform to the adjacent end of the drum 15.

Journaled in a bearing 35 at the right hand side of the machine is a shaft 36 carrying a scraper drum 37 equipped with a plurality of spaced, circular scraping blades or knives 38 adapted to remove the seed from the corn hurl during its passage through the machine, while journaled in a bearing 39 at the left hand side of the machine is a shaft 40 carrying a drum 41 equipped with disintegrating blades 42 which act upon the butt end of the hurl for severing the individual straws from the central spear or heart.

Extended transversely through the casing and journaled for rotation therein is a main drive shaft 43 adapted to be driven from any suitable source of power and having a pulley belt connection 44 with an auxiliary shaft 45 connected by a belt 46 with the shaft 40 of the cutting drum and by a second belt 47 with a transverse shaft 48, in turn connected by a belt 49 with the shaft 36 of the scraping device and by a belt 50 with the drum shaft 11 from which the drum 15 is driven through the medium of the feed belt 14, while the drum shaft 31 is connected to the main shaft 43 by means of the belt 51. Mounted at one end of the table 3 is a fixed cutting knife or blade 52 having on its active edge a plurality of sharpened teeth or serrations 53, while pivoted to the blade 52 is a movable cutting blade 54 adapted to coöperate with the blade 52 for severing the stalks of the corn from the hurl.

In practice, the whisks of broom corn are deposited on the table 3 and after removing the lower portion or stalks through the medium of the knives 52, 54, the hurl is introduced between the belts 14 and 26, and fed forwardly toward the drum 15. As the material advances the chopping blades 42 carried by the drum 41 act on the body of the hurl for severing or disconnecting the individual straws from one another and from the central spear or heart, while at the same time the scraping blades 38 serve to remove the seed from the hurl and at the same time thoroughly scrape and clean the latter. As the material passes from between the feed belts at the forward end of the belt 26, it is delivered onto the separating drum 15 and the finer straws enter between the teeth 20 while the coarser straws and hearts lodge on the heads 21, whereby as the drum continues to revolve the lighter straws are carried past the point of the deflector 9 and are directed into the compartment 6, while the larger straws escape from the drum 15 and fall between the teeth 33 of drum 30 by which they are directed downward on the forward portion of the shield and into the compartment 7. It is to be observed that the straws will be laid evenly in the respective compartments, and further, that the teeth 28 of the member 27 act for spreading the material over the drum 15 and directing the finer material between the teeth 20, while the shield 34 holds the forward ends of the straws to prevent them from flying upward from the drum while being acted upon by the member 27.

It is to be noted that in operation the machine, as above described, serves to effectually separate, clean and grade the material and to deposit the graded material smoothly and evenly in the individual compartments.

Having thus described my invention, what I claim is:

1. In a machine of the class described, a casing, a rear rotary feed drum sustained thereby, a rotary separator drum mounted in advance of the feed drum, a feed belt arranged for travel on said drums, a second feed belt mounted for travel above and to coöperate with the first named belt and terminated at its forward end at a point above the separated drum, separating teeth fixed to the latter and adapted to receive between them the finer grade of material and a pair of compartments into which the finer and coarser materials are delivered respectively.

2. In a machine of the class described, a casing, a pair of rotary drums sustained thereby, one in advance of the other, a main feed belt arranged for travel on said drums, an auxiliary feed belt lying above and adapted to coöperate with the main belt for feeding the material forward, a series of radially projecting separator teeth carried by the forward drum, a pair of compartments adapted to receive respectively the finer and coarser material as delivered from the separator drum and a deflecting shield centered above the compartments for directing the separated material thereinto.

3. In a machine of the class described, a casing, a pair of rotary drums sustained thereby, one in advance of the other, a main feed belt arranged for travel on said drums, an auxiliary feed belt sustained above and for coöperation with the main belt to feed the material forwardly, devices disposed respectively at opposite sides of the machine for severing the butt ends of the material and for scraping the same, means on the forward drum for grading the material, and a pair of compartments into which the graded material is delivered from the separating drum.

In testimony whereof, I affix my signature in presence of two witnesses.

OTTO J. WAHLER.

Witnesses:
 TIFFIN JINKS,
 JOHN T. WILSON